(12) United States Patent
Moon et al.

(10) Patent No.: US 11,909,435 B2
(45) Date of Patent: Feb. 20, 2024

(54) METHOD FOR MULTI-BAND COMMUNICATION AND ELECTRONIC DEVICE THEREOF

(71) Applicant: SAMSUNG ELECTRONICS CO., LTD., Suwon-si (KR)

(72) Inventors: Yohan Moon, Suwon-si (KR); Hyoseok Na, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 72 days.

(21) Appl. No.: 17/516,925

(22) Filed: Nov. 2, 2021

(65) Prior Publication Data

US 2022/0140855 A1    May 5, 2022

Related U.S. Application Data

(63) Continuation of application No. PCT/KR2021/015280, filed on Oct. 28, 2021.

(30) Foreign Application Priority Data

Nov. 2, 2020    (KR) .................. 10-2020-0144230

(51) Int. Cl.
*H04B 1/401* (2015.01)
*H04W 72/044* (2023.01)
*H04B 1/52* (2015.01)

(52) U.S. Cl.
CPC .............. *H04B 1/401* (2013.01); *H04B 1/52* (2013.01); *H04W 72/0473* (2013.01)

(58) Field of Classification Search
CPC ...... H04B 1/401; H04B 1/52; H04W 72/0473
See application file for complete search history.

(56) References Cited

U.S. PATENT DOCUMENTS 6,151,509 A * 11/2000 Chorey ................ H04B 1/0483
455/552.1
6,167,242 A * 12/2000 Henderson ............. H03F 1/303
455/127.1

(Continued)

FOREIGN PATENT DOCUMENTS

KR          10-0920273         12/2006
KR       10-2014-0010384        1/2014

(Continued)

OTHER PUBLICATIONS

Search Report dated Feb. 21, 2022 in counterpart International Patent Application No. PCT/KR2021/015280.

*Primary Examiner* — Jinsong Hu
*Assistant Examiner* — Rui M Hu
(74) *Attorney, Agent, or Firm* — Nixon & Vanderhye P.C.

(57) ABSTRACT

Disclosed is an electronic device including: first communication circuitry including a first amplifier, second communication circuitry including a second amplifier, a transceiver, a processor, and a power supply. The processor may be configured to: provide, to the first communication circuitry, a first voltage for transmitting a first signal using the power supply in a first time interval, and provide, to the second communication circuitry, a second voltage for transmitting a second signal using the power supply in a second time interval that does not overlap the first time interval.

16 Claims, 9 Drawing Sheets

(56) References Cited

U.S. PATENT DOCUMENTS

| | | | |
|---|---|---|---|
| 6,216,012 B1* | 4/2001 | Jensen | H03F 3/24 |
| | | | 455/553.1 |
| 6,288,606 B1* | 9/2001 | Ekman | H03F 1/3241 |
| | | | 330/149 |
| 6,397,077 B1* | 5/2002 | Jensen | H04B 1/005 |
| | | | 455/571 |
| 7,155,251 B2* | 12/2006 | Saruwatari | H04W 52/0274 |
| | | | 455/552.1 |
| 7,336,626 B1* | 2/2008 | Barratt | H04B 7/12 |
| | | | 370/281 |
| 7,925,227 B2* | 4/2011 | Ichitsubo | H04B 1/44 |
| | | | 455/114.1 |
| 8,660,041 B2 | 2/2014 | Niskanen et al. | |
| 8,842,581 B2 | 9/2014 | Hottinen | |
| 9,391,665 B2 | 7/2016 | Niskanen et al. | |
| 9,572,138 B2 | 2/2017 | Lee et al. | |
| 10,015,819 B2 | 7/2018 | Lee et al. | |
| 10,348,358 B1* | 7/2019 | Ramakrishnan | H04B 1/0483 |
| 10,447,458 B2* | 10/2019 | Chang | H04L 5/001 |
| 10,477,550 B2 | 11/2019 | Balteanu | |
| 10,485,048 B2 | 11/2019 | Zeng et al. | |
| 10,736,163 B2 | 8/2020 | Zeng et al. | |
| 11,064,491 B2 | 7/2021 | Balteanu | |
| 11,152,976 B2 | 10/2021 | Cho et al. | |
| 2003/0162513 A1* | 8/2003 | Saruwatari | H03F 3/24 |
| | | | 455/127.1 |
| 2008/0279125 A1* | 11/2008 | Hottinen | H04W 16/00 |
| | | | 370/281 |
| 2013/0135043 A1* | 5/2013 | Hietala | H03F 3/245 |
| | | | 330/124 R |
| 2013/0208636 A1 | 8/2013 | Niskanen et al. | |
| 2013/0286907 A1* | 10/2013 | Wei | H04L 5/001 |
| | | | 370/328 |
| 2014/0219141 A1 | 8/2014 | Niskanen et al. | |
| 2014/0362744 A1 | 12/2014 | Yan et al. | |
| 2015/0085634 A1* | 3/2015 | Yu | H03F 1/3241 |
| | | | 370/201 |
| 2016/0050665 A1* | 2/2016 | Chang | H04B 1/48 |
| | | | 370/280 |
| 2017/0005619 A1* | 1/2017 | Khlat | H03F 3/245 |
| 2017/0118724 A1* | 4/2017 | Mohaupt | H04W 4/80 |
| 2018/0013536 A1* | 1/2018 | Minn | H04L 5/18 |
| 2018/0048272 A1* | 2/2018 | Lin | H02M 3/158 |
| 2018/0123516 A1* | 5/2018 | Kim | H03F 3/189 |
| 2018/0132271 A1* | 5/2018 | Jung | H04W 16/14 |
| 2018/0152144 A1* | 5/2018 | Choo | H03F 3/211 |
| 2018/0152945 A1 | 5/2018 | Balteanu | |
| 2018/0302047 A1* | 10/2018 | Igarashi | H03F 3/217 |
| 2018/0368199 A1 | 12/2018 | Zeng et al. | |
| 2019/0379409 A1* | 12/2019 | Thompson | H04B 1/0057 |
| 2020/0045761 A1 | 2/2020 | Zeng et al. | |
| 2020/0229103 A1 | 7/2020 | Hosseini et al. | |
| 2020/0287577 A1* | 9/2020 | Hitomi | H04B 1/0458 |
| 2020/0305091 A1 | 9/2020 | Lee et al. | |
| 2020/0412307 A1* | 12/2020 | Hitomi | H03F 1/0222 |
| 2021/0075372 A1* | 3/2021 | Henzler | H03F 3/189 |
| 2021/0226672 A1 | 7/2021 | Cho et al. | |
| 2021/0242987 A1* | 8/2021 | Kazmi | H04L 5/0048 |
| 2021/0306127 A1* | 9/2021 | Sundberg | H04L 5/0048 |
| 2022/0368358 A1* | 11/2022 | Jang | H03F 1/0283 |
| 2023/0046261 A1* | 2/2023 | Yu | H03F 1/565 |

FOREIGN PATENT DOCUMENTS

| | | |
|---|---|---|
| KR | 10-2016-0019102 | 2/2016 |
| KR | 10-2020-0034551 | 3/2020 |
| KR | 2020-0086246 | 7/2020 |
| KR | 2020-0112377 | 10/2020 |

\* cited by examiner

METHOD FOR MULTI-BAND COMMUNICATION AND ELECTRONIC DEVICE THEREOF

CROSS-REFERENCE TO RELATED APPLICATIONS

This application is a continuation of International Application No. PCT/KR2021/015280 designating the United States, filed on Oct. 28, 2021, in the Korean Intellectual Property Receiving Office and claiming priority to Korean Patent Application No. 10-2020-0144230 filed on Nov. 2, 2020, in the Korean Intellectual Property Office, the disclosures of which are incorporated by reference herein in their entireties.

BACKGROUND

Field

The disclosure relates to a method for multi-band communication and an electronic device thereof.

Description of Related Art

In order to improve data throughput, communication using multiple bands is widely used. For example, an electronic device may perform carrier aggregation using a plurality of frequency bands. The electronic device may perform carrier aggregation using a primary component carrier (PCC) and a secondary component carrier (SCC) associated with a base station. For example, the electronic device may support multi-connectivity. When the electronic device supports dual connectivity, the electronic device may be configured to communicate with a plurality of base stations. The electronic device may support multi-connectivity by communicating with a plurality of base stations supporting the same radio access technology (RAT). The electronic device may support multi-connectivity (e.g., multi-RAT dual connectivity) with a plurality of base stations supporting different RATs. The electronic device may support, for example, evolved universal terrestrial access network (e-UTRA)-new radio (NR) dual connectivity (EN-DC) or NR-e-UTRA dual connectivity (NE-DC).

When the electronic device supports multi-connectivity, the electronic device may include a plurality of communication circuits for communication for each frequency band. Each of the plurality of communication circuits may be connected to at least one antenna. Each of the plurality of communication circuits may include at least one amplifier for controlling transmit power, and the control of transmit power may be performed based on power supplied by a power modulator. The control of transmit power for each band is performed independently, and thus the electronic device may include a plurality of power modulators corresponding to the plurality of respective communication circuits.

In order to establish an Internet of things (IoT) environment, various communication methods for electronic devices are studied. For example, a communication method such as massive machine type communication (MMTC) is being studied. The electronic device using such an MMTC may have relatively low functionality and cost. In this context, the 3rd generation partnership project (3GPP) has proposed the NR-LIGHT project. An object of NR-LIGHT is to provide an electronic device that requires a high data rate while having relatively low complexity and power consumption.

In order to improve the data rate, the electronic device may use multi-band communication. For multi-band communication, the electronic device may include a plurality of communication circuits and a plurality of power modulators. In order to support multi-band communication, the cost of the electronic device may be increased. In addition, due to components for supporting multi-band communication, the size of the electronic device may be increased. Furthermore, the electronic device may have relatively high complexity and power consumption.

SUMMARY

Embodiments of the disclosure may provide an electronic device and a method for addressing the above-described problems.

According to an example embodiment of the present disclosure, an electronic device is provided, the electronic device including: a first communication circuit connected to a first antenna and including a first amplifier, a second communication circuit connected to a second antenna and including a second amplifier, a transceiver connected to the first communication circuit and the second communication circuit, a processor electrically connected to the transceiver, and a power (e.g., voltage) supply electrically connected to the first communication circuit, the second communication circuit, and the processor, wherein the processor is configured to: provide, to the first communication circuit, a first voltage for transmitting a first signal using the power supply in a first time interval, and provide, to the second communication circuit, a second voltage for transmitting a second signal using the power supply in a second time interval that does not overlap the first time interval.

According to an example embodiment of the present disclosure, an electronic device is provided, the electronic device including: a first communication circuit connected to a first antenna and including a first amplifier, a second communication circuit connected to a second antenna and including a second amplifier, a processor connected to the first communication circuit and the second communication circuit, and a power supply electrically connected to the first communication circuit, the second communication circuit, and the processor, wherein the power supply is configured to: supply, to the first communication circuit, a first voltage for transmitting a first signal in a first time interval, and supply, to the second communication circuit, a second voltage for transmitting a second signal in a second time interval that does not overlap the first time interval.

According to various example embodiments disclosed in the present disclosure, an electronic device may increase the data rate through multi-band communication.

According to various example embodiments disclosed in the present disclosure, an electronic device may be implemented with low complexity and cost by transmitting signals so that a plurality of frequency bands do not overlap each other.

Besides, various effects may be provided that are directly or indirectly identified through the present disclosure.

BRIEF DESCRIPTION OF THE DRAWINGS

The above and other aspects, features and advantages of certain embodiments of the present disclosure will be more apparent from the following detailed description, taken in conjunction with the accompanying drawings, in which.

With respect to the description of the drawings, the same or similar reference signs may be used for the same or similar elements.

DETAILED DESCRIPTION

Hereinafter, various example embodiments of the disclosure will be described with reference to the accompanying drawings. However, this is not intended to limit the present disclosure to the specific embodiments, and it is to be construed to include various modifications, equivalents, and/or alternatives of embodiments of the present disclosure.

Figure 1:
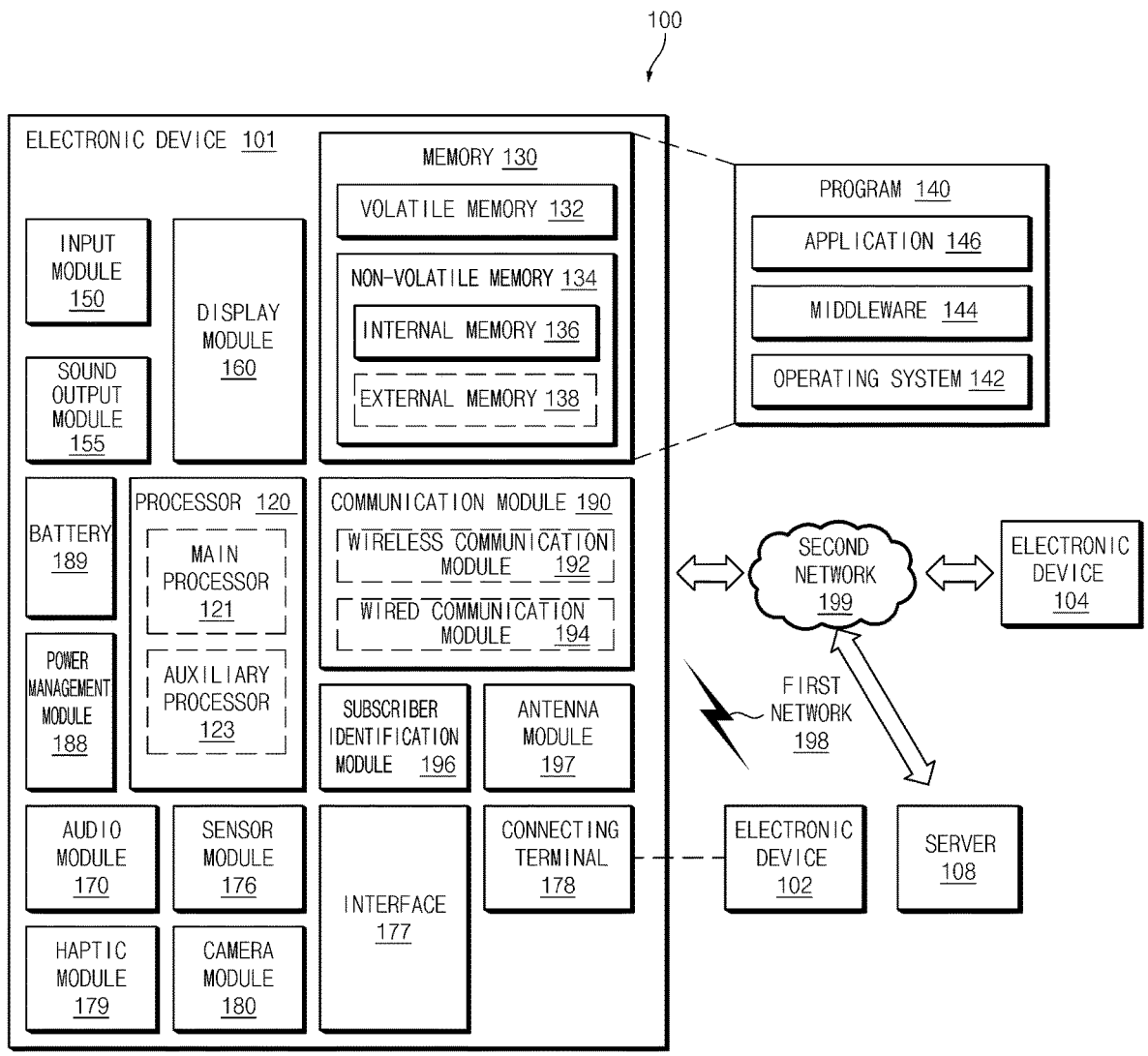
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
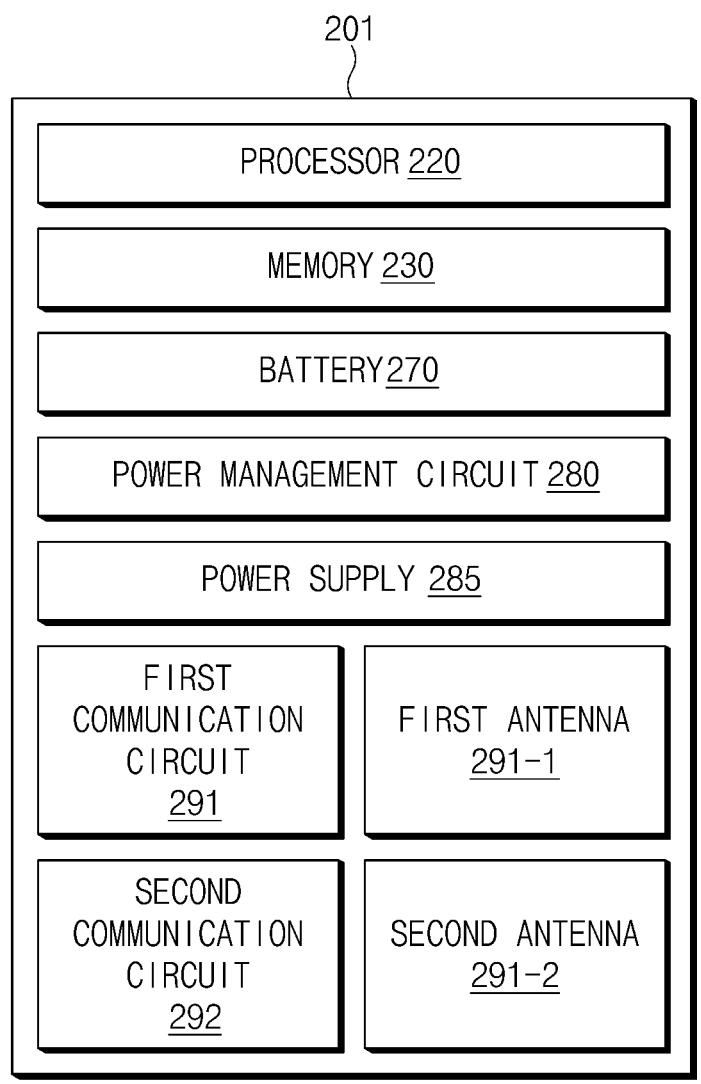
FIG. 2 is a block diagram illustrating an example configuration of an electronic device according to various embodiments.

FIG. 2 is a block diagram illustrating an example configuration of an electronic device according to various embodiments.

According to an embodiment, an electronic device 201 (e.g., the electronic device 101 of FIG. 1) may include a processor (e.g., including processing circuitry) 220, a memory 230, a battery 270, a power management circuit 280, a power supply 285, a first communication circuit 291, a first antenna 291-1, a second communication circuit 292, and/or a second antenna 291-2. For example, and without limitation, the electronic device 201 may be a smartphone, an IoT device, a sensor device, a low-power device, or the like.

The processor 220 may include various processing circuitry, including, for example, at least one processor. For example, the processor 220 may include a communication processor (e.g., the auxiliary processor 123 and/or the communication module 190 of FIG. 1). The processor 220 may include an application processor (e.g., the processor 120 of FIG. 1). The processor 220 may include a communication processor and an application processor. For example, the communication processor may include a transceiver. The processor 220 may be configured to be operatively and/or electrically connected to components of the electronic device 201 and perform various operations of the electronic device 201 using or controlling the components of the electronic device 201. For example, the processor 220 may be operatively connected with the memory 230 (e.g., the memory 130 of FIG. 1), and perform various operations of the electronic device 201 based on the execution of instructions stored in the memory 230.

The processor 220 may include various processing circuitry and be configured to perform signal processing. For example, the processor 220 may modulate and/or up-convert the transmitted data to generate a signal, and transmit the generated signal to the first communication circuit 291 and/or the second communication circuit 292. For example, the processor 220 may receive a signal from the first communication circuit 291 and/or the second communication circuit 292 and demodulate and/or down-convert the signal to obtain received data.

The battery 270 (e.g., the battery 189 of FIG. 1) may be configured to supply power to various components of the electronic device 201. For example, the battery 270 may be electrically connected to the power management circuit 280 (e.g., the power management module 188 of FIG. 1), and supply power to various components of the electronic device 201 via the power management circuit 280. The power management circuit 280 may be configured to control charging and power supply of the battery 270, for example. The power management circuit 280 may be operatively and/or electrically connected to the power supply 285, and may supply the power supply 285 with at least a portion of the power received from the battery 270. In various embodiments of the present disclosure, the battery 270 may be replaced with any power source. For example, instead of the battery 270, a relatively fixed power source such as an electric outlet may be used.

The power supply 285 may use the power received from the power management circuit 280 to supply voltages to a plurality of communication circuits (e.g., the first communication circuit 291 and/or the second communication circuit 292). The power supply 285 may supply voltages to the plurality of communication circuits based on average power tracking (APT) and/or envelope power tracking (EPT). If the APT method is used, the power supply 285 may supply voltages based on the average transmit power of the communication circuits to which voltages are supplied. If the EPT method is used, the power supply 285 may supply voltages based on envelopes of transmit powers of the communications circuits to which voltages are supplied. For example, the processor 220 may determine the voltage based on envelopes of transmit powers and transmit the determined voltage information to the power supply 285. The power supply 285 may supply voltages to the communication circuits based on the voltage information received from the processor 220.

According to an embodiment, the power supply 285 may supply voltages to a plurality of communication circuits in a time division manner. For example, the power supply 285 may supply a first voltage to the first communication circuit 291 in a first time interval and supply a second voltage to the second communication circuit 292 in a second time interval. The first time interval and the second time interval may not overlap each other. Since the power supply of the power supply 285 is performed based on a time-division scheme, one power supply 285 may supply voltages to a plurality of communication circuits. In an example, the processor 220 may control the power supply 285 to supply voltages in a time-division manner.

The first communication circuit 291 may be electrically connected to the first antenna 291-1. The second communication circuit 292 may be electrically connected to the second antenna 291-2. Each of the first communication circuit 291 and the second communication circuit 292 may be referred to, for example, as a radio frequency front end (RFFE). The first communication circuit 291 and the second communication circuit 292 may include at least one reception path for receiving signals from each of the first antenna 291-1 and the second antennas 291-2 and transmitting the received signals to the processor 220. For example, the first communication circuit 291 and the second communication circuit 292 may filter the received signals and transmit the filtered signals to the processor 220. In an example, the first communication circuit 291 and the second communication circuit 292 may perform down-converting on the received signals. The first communication circuit 291 and the second communication circuit 292 may include at least one transmission path for transmitting signals using the first antenna 291-1 and the second antenna 291-2, respectively. For example, the first communication circuit 291 and the second communication circuit 292 may amplify and filter the signals received from the processor 220, and may transmit the filtered signals through the first antenna 291-1 and/or the second antenna 291-2. In an example, the first communication circuit 291 and the second communication circuit 292 may perform up-converting on the signals. Each of the first communication circuit 291 and the second communication circuit 292 may include at least one amplifier for amplifying signals. Each of the first communication circuit 291 and the second communication circuit 292 may be configured to control a gain of the at least one amplifier based on the voltage received from the power supply 285. In FIG. 2, two communication circuits are illustrated as being included in the electronic device 201; however, the electronic device 201 may include three or more communication circuits.

Each of the first antenna 291-1 and the second antenna 291-2 may include, for example, at least one conductive plate, a conductor, a radiator, and/or a conductive pattern. For example, each of the first antenna 291-1 and the second antenna 291-2 may include at least a portion of a metallic frame exposed to the outside of the electronic device 201, a conductive pattern on a PCB inside the housing of the electronic device 201, a conductor inside the electronic device 201, a conductive pattern on one side of the housing, or an antenna derived from the housing. The number of antennas shown in FIG. 2 is merely an example, and embodiments of the present disclosure are not limited thereto. For example, the electronic device 201 may include three or more antennas.

According to an embodiment, the electronic device 201 may include a power supply 285 and a plurality of communication circuits. For example, the electronic device 201 may supply voltages to a plurality of communication circuits using one power supply 285. Referring to FIGS. 3 to 9, the electronic device 201 may supply voltages to a plurality of communication circuits in a time-division manner. The cost, power consumption, and/or size of the electronic device 201 may be reduced using the power supply 285, the number of which is small compared to the number of communication circuits.

Figure 3:
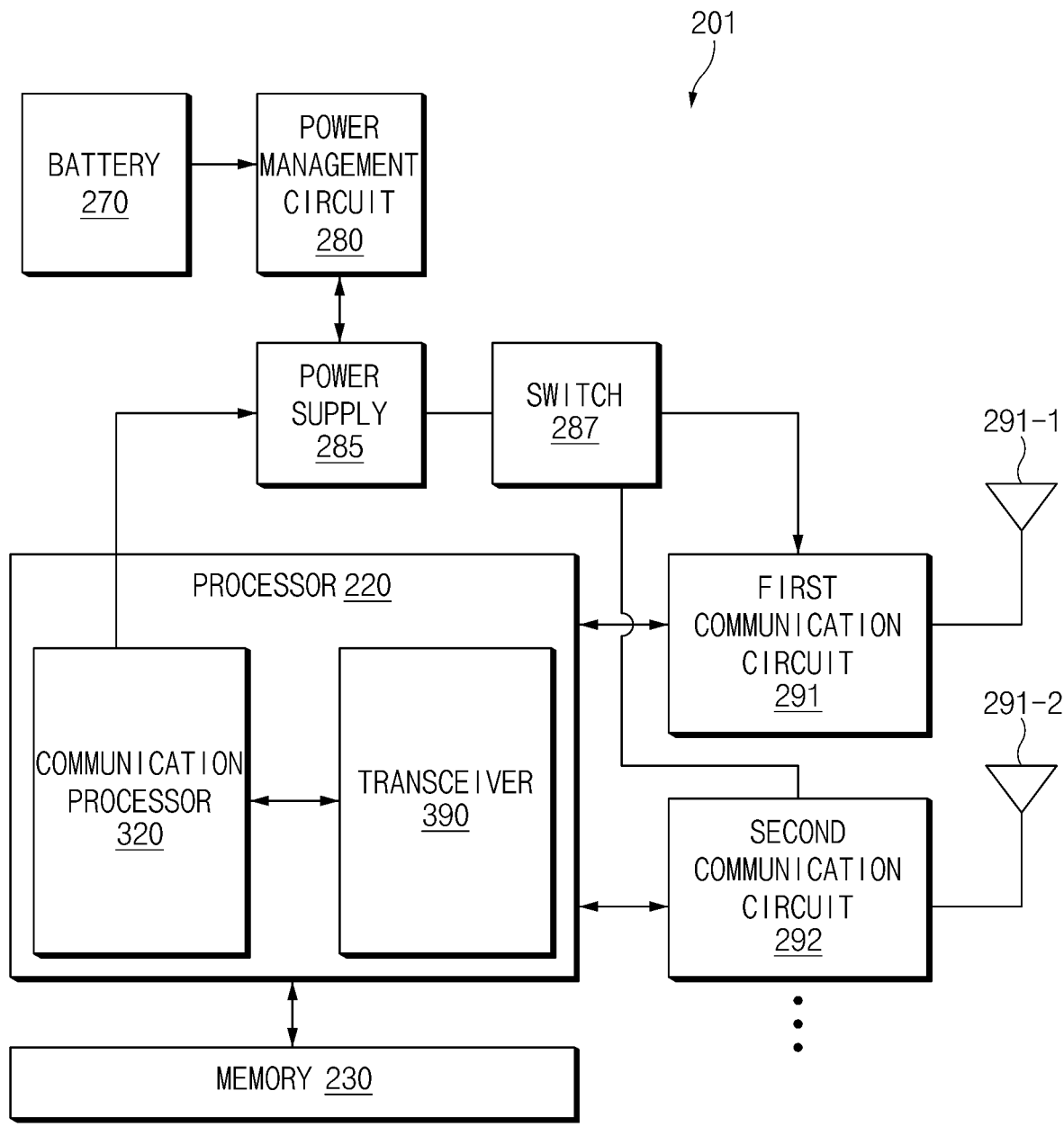
FIG. 3 is a block diagram illustrating an example configuration of the electronic device according to various embodiments.

FIG. 3 is a block diagram illustrating an example configuration of the electronic device according to various embodiments.

Referring to FIG. 3, the battery 270 may be electrically connected to the power management circuit 280. The power management circuit 280 may be electrically and/or operatively connected to power supply 285. The power supply 285 may be electrically connected to the first communication circuit 291 and the second communication circuit 292.

In an example, the processor 220 may include a communication processor 320 and a transceiver 390 (e.g., transmit/receive circuit). The processor 220 may be operatively connected to a separate processor (e.g., an application processor) and the memory 230. The transceiver 390 may include, for example, a radio frequency (RF) transceiver or an RF integrated circuit (IC). The transceiver 390 may be electrically connected to communication circuits 291 and 292, and may transmit a signal to, or receive a signal from, communication circuits 291 and 292. The transceiver 390 may process a signal in an RF band. For example, the transceiver 390 may modulate a digital signal output from the communication processor 320 into an RF signal. For another example, the transceiver 390 may demodulate an RF signal into a digital signal. The communication processor 320 may process a digital signal, for example.

According to an embodiment, the electronic device 201 may be configured to perform communication using a plurality of frequency bands. For example, the electronic device 201 may perform communication using a plurality of frequency bands for carrier aggregation (CA) or dual connectivity (DC). For example, the first communication circuit 291 may be configured to transmit and receive a signal of a first frequency band (e.g., a first component carrier wave), and the second communication circuit 292 may be configured to transmit and receive a signal of a second frequency band (e.g., a second component carrier wave).

For example, the signal of the first frequency band may be referred to as a first signal, and the signal of the second frequency band may be referred to as a second signal. The first frequency band and the second frequency band may be frequency bands that do not overlap each other. According to an example, the first signal and the second signal may be associated with the same base station. In another example, the first signal may be associated with a first cell of a first base station, and the second signal may be associated with a second cell of a second base station. According to an example, the first signal and the second signal may be associated with different base stations. The first signal may be associated with a first cell of a first base station, and the second signal may be associated with a second cell of a second base station. According to an example, the first signal and the second signal may be associated with the same radio access technology (RAT). The first signal and the second signal may be associated with LTE or 5G NR. According to an example, the first signal and the second signal may be associated with different RATs. The first signal may be associated with LTE and the second signal may be associated with 5G NR. Conversely, the first signal may be associated with 5G NR and the second signal may be associated with LTE.

The first communication circuit 291 and the second communication circuit 292 may receive, from the power supply 285, a voltage for controlling the transmit power. For example, the control of the transmit power for the first signal and the transmit power for the second signal may be independently performed. The power supply 285 may obtain envelope waveform information on the transmit power for the first signal from the processor 220 (e.g., the communication processor 320) and supply the first voltage to the first communication circuit 291 based on the obtained envelope waveform information. The power supply 285 may obtain envelope waveform information on the transmit power for the second signal from the processor 220 and supply the second voltage to the second communication circuit 292 based on the obtained envelope waveform information. Accordingly, the first communication circuit 291 and the second communication circuit 292 may be configured to control the transmit powers based on different voltages. For example, the power supply 285 may be configured to output only one voltage in a time domain.

According to an embodiment, the power supply 285 may be selectively connected to the first communication circuit 291 or the second communication circuit 292 via a switch 287. For example, the processor 220 may control the switch 287 to connect the power supply 285 to the first communication circuit 291 or to connect the power supply 285 to the second communication circuit 292.

In the above example, the first voltage and the second voltage have been described as being based on envelope waveform information; however, embodiments of the present disclosure are not limited thereto. For another example, the first voltage or the second voltage may be controlled based on the average power. In this case, the power supply 285 may supply the first voltage to the first communication circuit 291 based on the average value of the transmit power of the first signal, or supply the second voltage to the second communication circuit 292 based on the average value of the transmit power of the second signal. For yet another example, the power supply 285 may supply a constant voltage of a specified magnitude (e.g., a voltage of a specified magnitude) to at least one of the first communication circuit 291 or the second communication circuit 292. A signal transmission/reception method of the first communication circuit 291 and the second communication circuit 292 may be described later with reference to FIG. 4.

Figure 4:
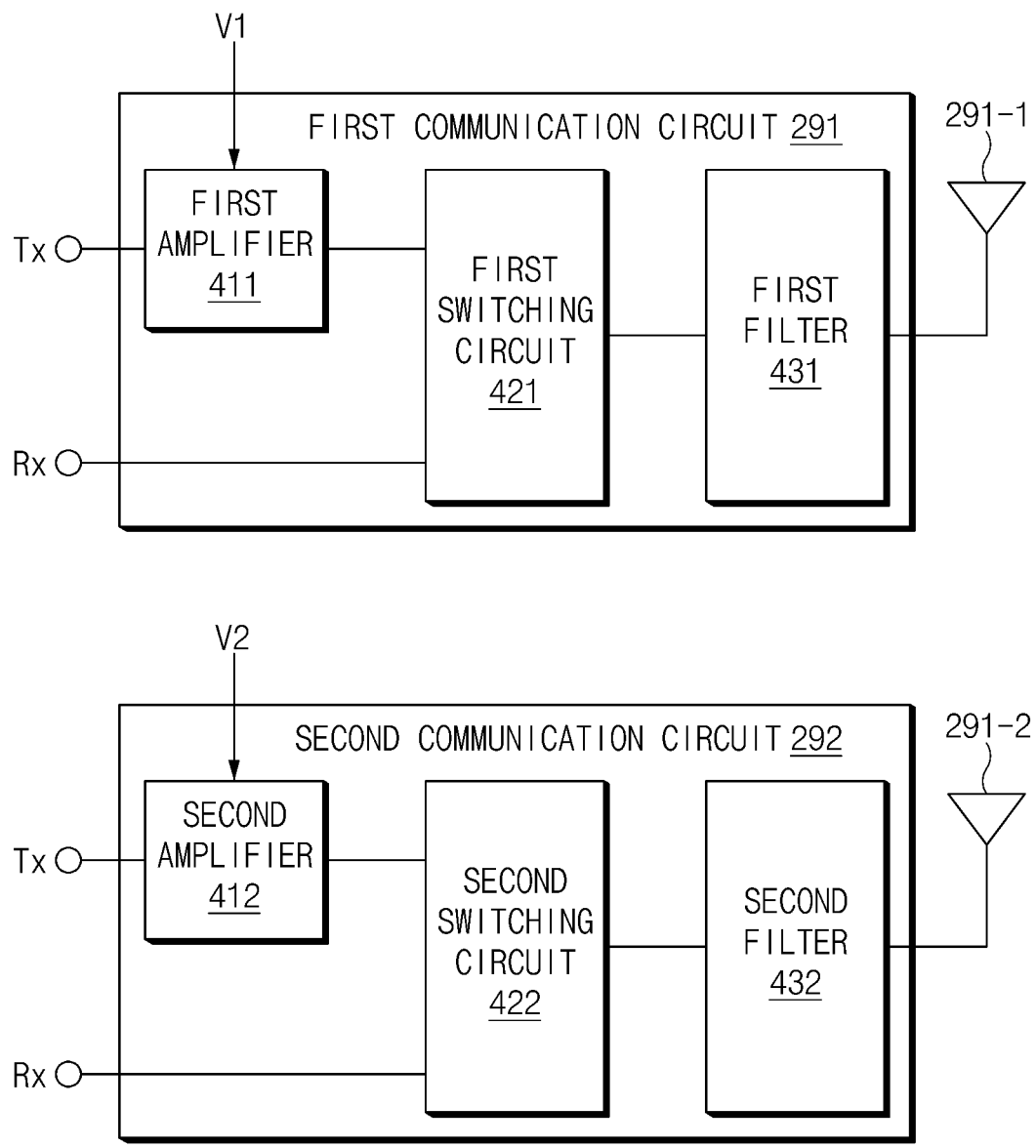
FIG. 4 is a block diagram illustrating an example configuration of a communication circuit according to various embodiments.

FIG. 4 are block diagrams illustrating example configurations of a communication circuit according to various embodiments.

Referring to FIG. 4, the first communication circuit 291 may include a first amplifier 411, a first switching circuit 421, and a first filter 431. The first amplifier 411 may include at least one amplifier (e.g., a power amplifier). A gain of the first amplifier 411 may be controlled based on a first voltage V1 received from the power supply 285. The first switching circuit 421 may connect the first antenna 291-1 to the transmission path or the reception path of the first communication circuit 291. The processor 220 (refer to FIGS. 2 and 3) may control the first communication circuit 291 to receive or transmit a signal by controlling the first switching circuit 421. The first filter 431 may include at least one filter. The configuration of the first communication circuit 291 illustrated in FIG. 4 is merely an example, and embodiments of the present disclosure are not limited thereto.

According to an embodiment, the processor 220 may receive a signal of a first band using the first communication circuit 291. For example, the processor 220 may use the first switching circuit 421 to allow the first antenna 291-1 to connect the first communication circuit 291 to the reception path. The signal caused by the first antenna 291-1 may be noise-removed by the first filter 431 and transmitted to at least one receive port Rx of the processor 220 via the first switching circuit 421. In the present example, the reception path of the first communication circuit 291 may further include an amplifier for amplifying a reception signal.

According to an embodiment, the processor 220 may transmit a signal of the first band using the first communication circuit 291. For example, the processor 220 may use the first switching circuit 421 to allow the first antenna 291-1 to connect the first communication circuit 291 to the transmission path. The processor 220 may transmit a signal to the first communication circuit 291 via at least one transmit port Tx. The first amplifier 411 may amplify the received signal based on the received first voltage. The amplified signal may be transmitted to the first antenna 291-1 through the first switching circuit 421 and the first filter 431.

The second communication circuit 292 may include a second amplifier 412, a second switching circuit 422, and a second filter 432. The second amplifier 412 may include at least one amplifier (e.g., a power amplifier). A gain of the second amplifier 412 may be controlled based on a second voltage V2 received from the power supply 285. The second switching circuit 422 may connect the second antenna 291-2 to the transmission path or the reception path of the second communication circuit 292. The processor 220 may control the second switching circuit 422 to control the second communication circuit 292 to receive or transmit a signal. The second filter 432 may include at least one filter. The configuration of the second communication circuit 292 illustrated in FIG. 4 is merely an example, and embodiments of the present disclosure are not limited thereto.

According to an embodiment, the processor 220 may receive a signal of a second band using the second communication circuit 292. For example, the processor 220 may use the second switching circuit 422 to allow the second antenna 291-2 to connect the second communication circuit 292 to the reception path. The signal caused by the second antenna 291-2 may be noise-removed by the second filter 432 and transmitted to at least one receive port Rx of the processor 220 via the second switching circuit 422. In the present example, the reception path of the second communication circuit 292 may further include an amplifier for amplifying a reception signal.

According to an embodiment, the processor 220 may transmit a signal of the second band using the second communication circuit 292. For example, the processor 220 may use the second switching circuit 422 to allow the second antenna 291-2 to connect the second communication circuit 292 to the transmission path. The processor 220 may transmit a signal to the second communication circuit 292 via at least one transmit port Tx. The second amplifier 412 may amplify the received signal based on the received second voltage. The amplified signal may be transmitted to the second antenna 291-2 through the second switching circuit 422 and the second filter 432.

Figure 5:
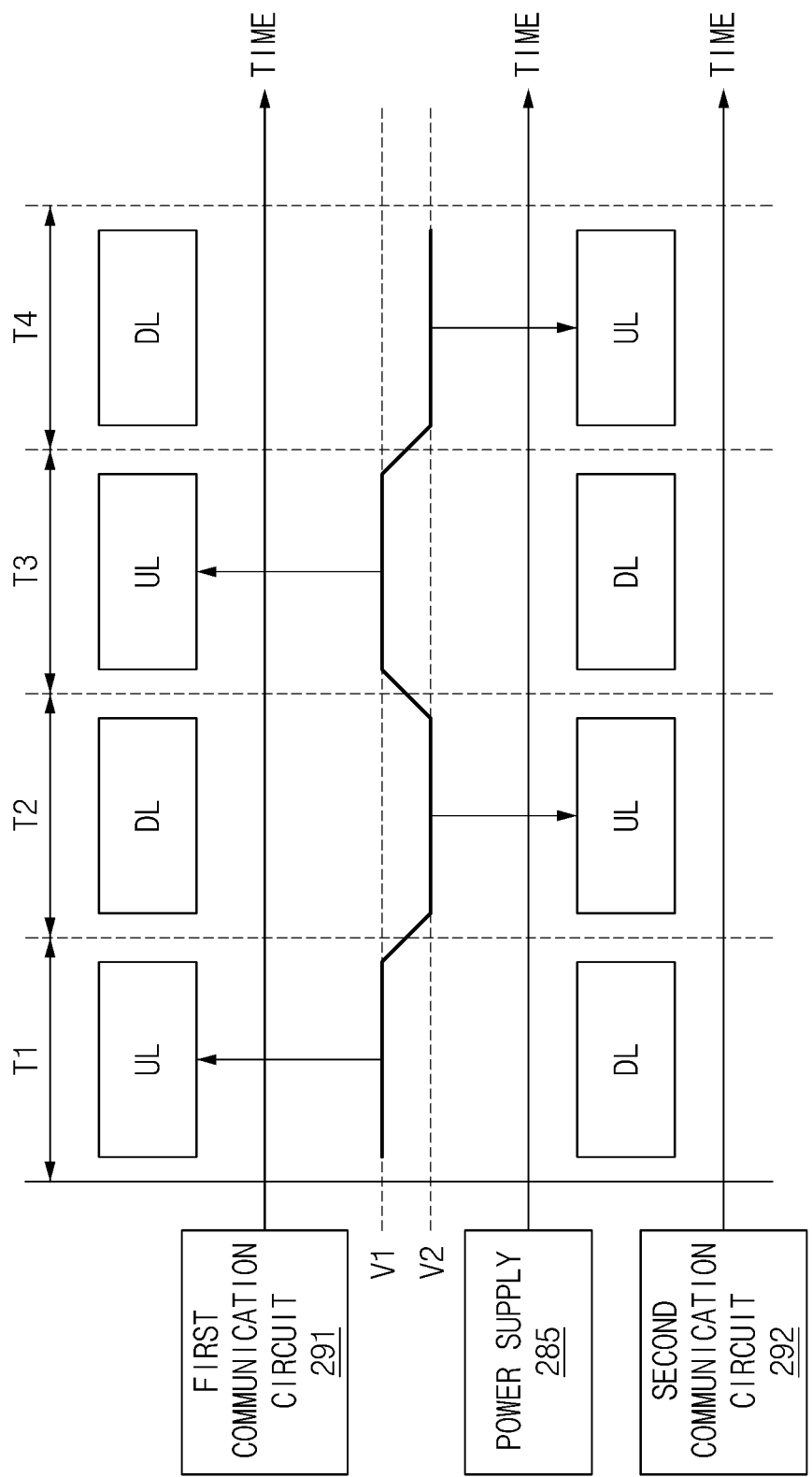
FIG. 5 is a diagram illustrating an example voltage supply according to various embodiments.

FIG. 5 is a diagram illustrating an example voltage supply according to various embodiments.

An electronic device (e.g., the electronic device 201 of FIG. 2) may be configured to transmit and receive a first signal and a second signal based on time-division duplexing (TDD). For example, the electronic device 201 may be configured to transmit and receive the first signal and the second signal for multiple transmission such as uplink carrier aggregation (CA) or EN-DC. According to an embodiment, the electronic device 201 may allocate a slot or a subframe so that an uplink section of a slot configuration associated with the first communication circuit 291 and an uplink section of a slot configuration associated with the second communication circuit 292 do not overlap each other. According to an embodiment, the electronic device 201 may divide one slot or subframe, thereby making it possible to perform uplink transmission so that the uplink section associated with the first communication circuit 291 and the uplink section associated with the second communication circuit 292 do not overlap each other.

In the example of FIG. 5, in a first time interval T1, a processor (e.g., the processor 220 of FIG. 2) may use the first communication circuit 291 to transmit an uplink (UL) signal for the first frequency band. For example, the processor 220 may connect a first antenna (e.g., the first antenna 291-1 of FIG. 2) to the transmission path of the first communication circuit 291, and transmit, to the first communication circuit 291, a signal containing data to be transmitted. In the first time interval T1, the processor 220 may use the second communication circuit 292 to receive a downlink (DL) signal of the second frequency band. For example, the processor 220 may connect the second antenna 291-2 to the reception path of the second communication circuit 292 and receive the signal received from the second communication circuit 292.

In the first time interval T1, the power supply 285 may supply the first voltage V1 for controlling the transmit power of the uplink signal to the first communication circuit 291. For example, the processor 220 may identify envelope information of the transmit power associated with the first communication circuit 291 and transmit the envelope information to the power supply 285. The power supply 285 may identify the first voltage V1 based on the envelope information. For another example, the power supply 285 may identify the first voltage V1 based on the average value of transmit power associated with the first communication circuit 291.

In a second time interval T2, the processor 220 may use the second communication circuit 292 to transmit an uplink (UL) signal for the second frequency band. For example, the processor 220 may connect a second antenna (e.g., the second antenna 291-2 of FIG. 2) to the transmission path of the second communication circuit 292, and transmit, to the second communication circuit 292, a signal containing data to be transmitted. In the second time interval T2, the processor 220 may use the first communication circuit 291 to receive a downlink (DL) signal of the first frequency band. For example, the processor 220 may connect the first antenna 291-1 to the reception path of the first communication circuit 291 and receive the signal received from the first communication circuit 291.

In the second time interval T2, the power supply 285 may supply a second voltage V2 for controlling the transmit power of the uplink signal to the second communication circuit 292. For example, the processor 220 may identify envelope information of the transmit power associated with the second communication circuit 292 and transmit the envelope information to the power supply 285. The power supply 285 may identify the second voltage V2 based on the envelope information. For another example, the power supply 285 may identify the second voltage V2 based on the average value of transmit power associated with the second communication circuit 292.

In a third time interval T3, the processor 220 may use the power supply 285 to supply the first voltage V1 to the first communication circuit 291, in order to transmit the signal of the first frequency band.

In a fourth time internal T4, the processor 220 may use the power supply 285 to supply the second voltage V2 to the second communication circuit 292, in order to transmit the signal of the second frequency band.

In the example of FIG. 5, the processor 220 may use one power supply 285 to supply voltages for transmitting signals to a plurality of communication circuits, by setting a time slot or subframe so that the uplink sections of the first communication circuit 291 and the second communication circuit 292 do not overlap each other. For example, each of the first to fourth time intervals T1, T2, T3, and T4 may correspond to one subframe or one slot.

In the example of FIG. 5, the first voltage V1 and/or the second voltage V2 may be set according to EPT, APT, or a specified value. In the present example, the first voltage V1 and the second voltage V2 are illustrated as having different values; however, embodiments of the present document are not limited thereto. In an example, the first voltage V1 and the second voltage V2 may be set to the same value.

In the example of FIG. 5, the processor 220 may divide the time slot or subframe so that the uplink sections of the first communication circuit 291 and the second communication circuit 292 do not overlap each other. For example, the first time interval T1 and the second time interval T2 may include one subframe or one slot. The third time interval T3 and the fourth time interval T4 may include one subframe or one slot.

In FIG. 5, two communication circuits are used; however, embodiments of the present disclosure are not limited thereto. The processor 220 may use three or more communication circuits to transmit signals. By providing transmission timings of uplink signals associated with a plurality of communication circuits that do not overlap as long as an uplink duty cycle allows, the processor 220 may use one power supply 285 to perform multiple transmission using the plurality of communication circuits.

In the example of FIG. 5, the processor 220 uses a time when each communication circuit is not used for uplink to perform reception of a downlink signal; however, embodiments of the present disclosure are not limited thereto. For example, in the first time interval T1 and/or the third time interval T3, the processor 220 may not use the second communication circuit 292 to receive a downlink signal. For another example, in the second time interval T2 and/or the fourth time interval T4, the processor 220 may not use the first communication circuit 291 to receive a downlink signal.

Figure 6:
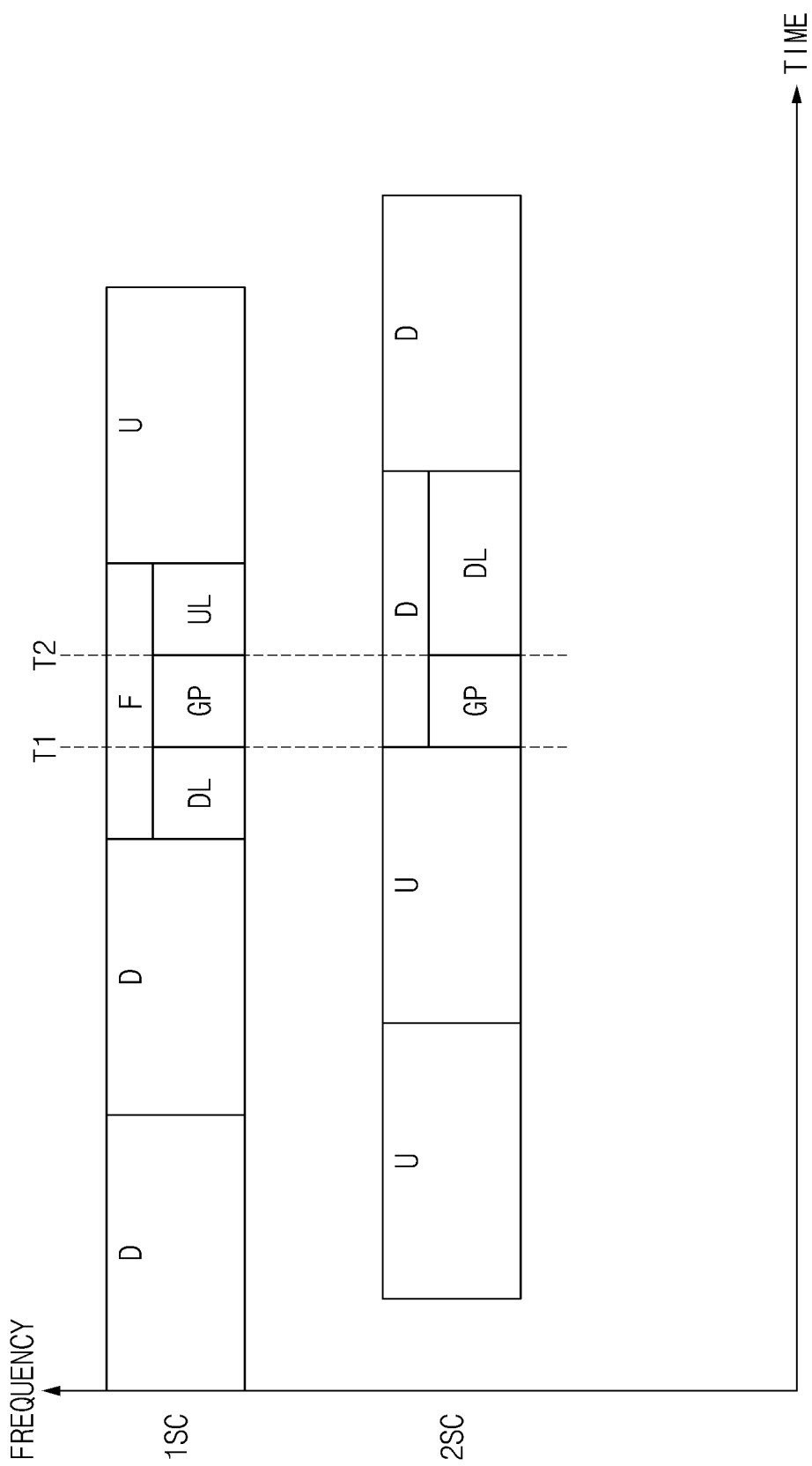
FIG. 6 is a diagram illustrating example transmission timing control according to various embodiments.

FIG. 6 is a diagram illustrating example transmission timing control according to various embodiments.

Referring to FIG. 6, an electronic device (e.g., the electronic device 201 of FIG. 2) may communicate using a first subcarrier 1SC of a first frequency band and a second subcarrier 2SC of a second frequency band. For example, the electronic device 201 may be configured to transmit and receive the first signal through the first subcarrier 1SC and transmit and receive the second signal through the second subcarrier 2SC for multiple transmission such as uplink carrier aggregation (CA) or EN-DC. In the example of FIG. 6, D may indicate a downlink subframe, U may indicate an uplink subframe, and F may indicate a flexible subframe (e.g., a special subframe). For example, a guard period GP may refer to a time for guaranteeing a configuration change of a communication circuit when switching between downlink and uplink is performed.

For example, if switching from the downlink subframe D to the uplink subframe U is performed, the flexible subframe F may be positioned between the two subframes. If the switching from the uplink subframe U to the downlink subframe D is performed, the front part of the downlink subframe D may be used as the guard period GP.

In the example of FIG. 6, timings of the first subcarrier 1SC and the second subcarrier 2SC may be different. For example, offsets associated with the first subcarrier 1SC and the second subcarrier 2SC may be different. Since signal transmission and reception are not scheduled in the guard period GP, uplink time intervals of the first subcarrier 1SC and the second subcarrier 2SC may not overlap each other.

In the examples of FIGS. 5 and 6, the processor 220 may set the uplink section of the first frequency band and the uplink section of the second frequency band so as not to overlap each other. In an example, if the electronic device 201 is a specific type of electronic device, the electronic device 201 may be configured to transmit an uplink signal so that uplink sections for a plurality of frequency bands do not overlap each other.

According to an embodiment, the electronic device 201 may communicate based on a radio resource configuration received from a base station. For example, the electronic device 201 may communicate based on a first radio resource configuration (e.g., subframe configuration information and/or slot configuration information) for the first frequency band. The electronic device 201 may communicate based on a second radio resource configuration (e.g., subframe configuration information and/or slot configuration information) for the second frequency band.

In an example, the base station may set the first radio resource configuration and the second radio resource configuration so that uplink sections for two frequency bands do not overlap each other. For example, the base station may set the radio resource configuration and the second radio resource configuration based on the information regarding the electronic device 201 (e.g., the type of the electronic device 201 and/or the capability of the electronic device 201) received from the electronic device 201. The electronic device 201 may transmit, to the base station, a signal containing the information regarding the electronic device 201. If the type of the electronic device 201 corresponds to a specified type, or if the capability of the electronic device 201 corresponds to a specified capability, the base station may set the first radio resource configuration and the second radio resource configuration so that uplink sections do not overlap each other, and may transmit the set first radio resource configuration and second radio resource configuration to the electronic device 201.

In an example, the base station may allow the electronic device 201 to determine uplink and downlink resources for two frequency bands. For example, the base station may configure both the radio resources of the first frequency band and the second frequency band as flexible subframes (e.g., special subframes). For example, the base station may set the radio resource configuration and the second radio resource configuration based on the information regarding the electronic device 201 (e.g., the type of the electronic device 201 and/or the capability of the electronic device 201) received from the electronic device 201. The electronic device 201 may transmit signals so that the uplink of the first frequency band and the uplink of the second frequency band do not overlap each other, based on the received first radio resource configuration and second radio resource configuration.

Figure 7:
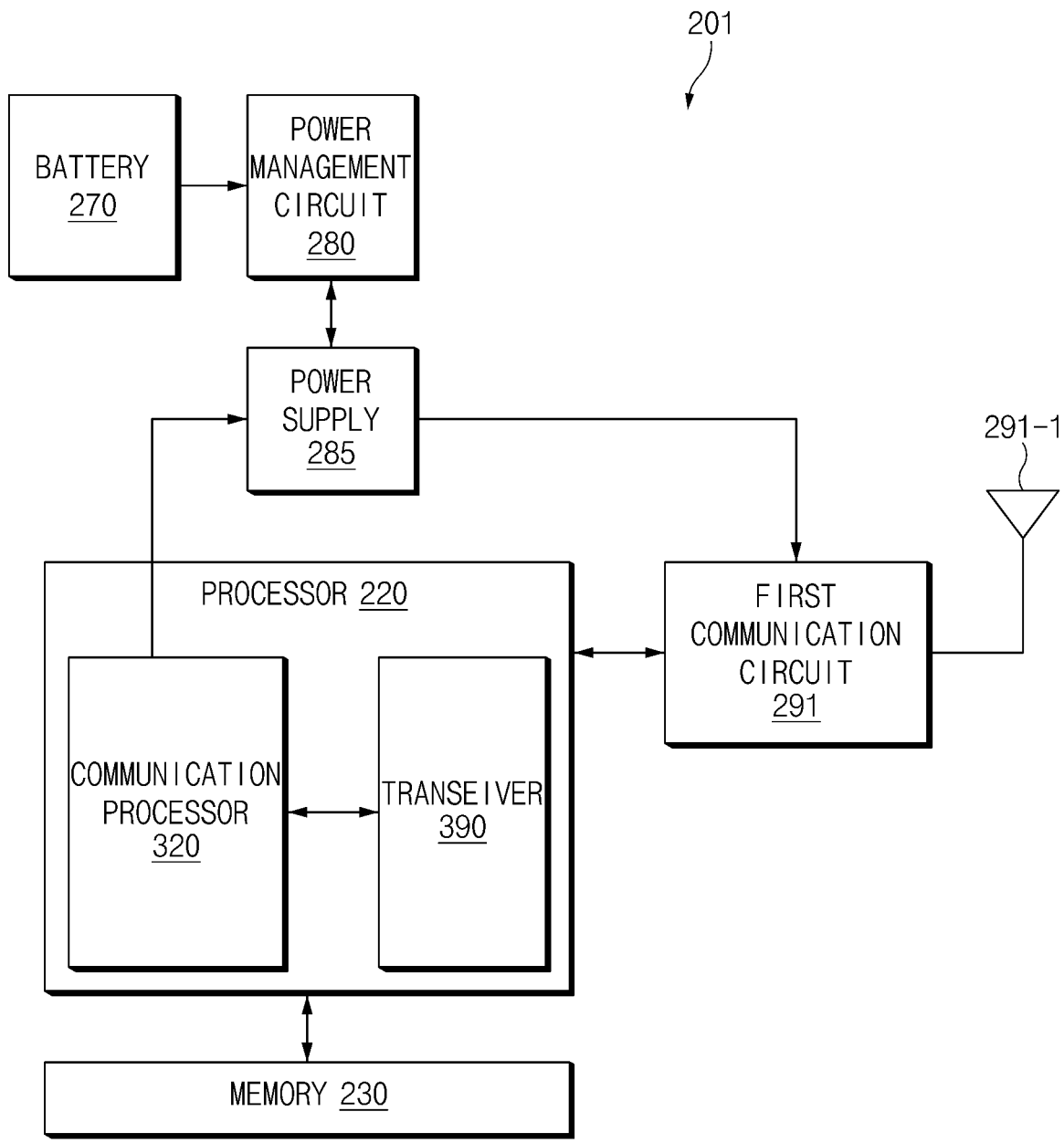
FIG. 7 is a block diagram illustrating an example configuration of the electronic device according to various embodiments.

FIG. 7 is a block diagram illustrating an example configuration of the electronic device according to various embodiments.

With reference to FIGS. 2, 3, 4, 5 and 6, the electronic device 201 has been described as including a plurality of communication circuits; however, embodiments of the present disclosure are not limited thereto. In the example of FIG. 7, the electronic device 201 may perform communication for a plurality of frequency bands using one communication circuit. Referring to FIG. 7, the electronic device 201 may include the first communication circuit 291.

The electronic device 201 may be configured to perform communication using a plurality of frequency bands. For example, the electronic device 201 may perform communication using a plurality of frequency bands for carrier aggregation (CA) or dual connectivity (DC). For example, the electronic device 201 may be configured to transmit and receive signals of a first frequency band (e.g., a first component carrier) and a second frequency band (e.g., a second component carrier) using the first communication circuit 291. The electronic device 201 may support communication for a plurality of frequency bands using one communication circuit (e.g., the first communication circuit 291), by providing the radio resource for the first frequency band and the radio resource for the second frequency band without overlapping each other in the time domain. For example, the electronic device 201 may supply voltages to the first communication circuit 291 in a time division manner, as will be described later with reference to FIG. 8.

Figure 8:
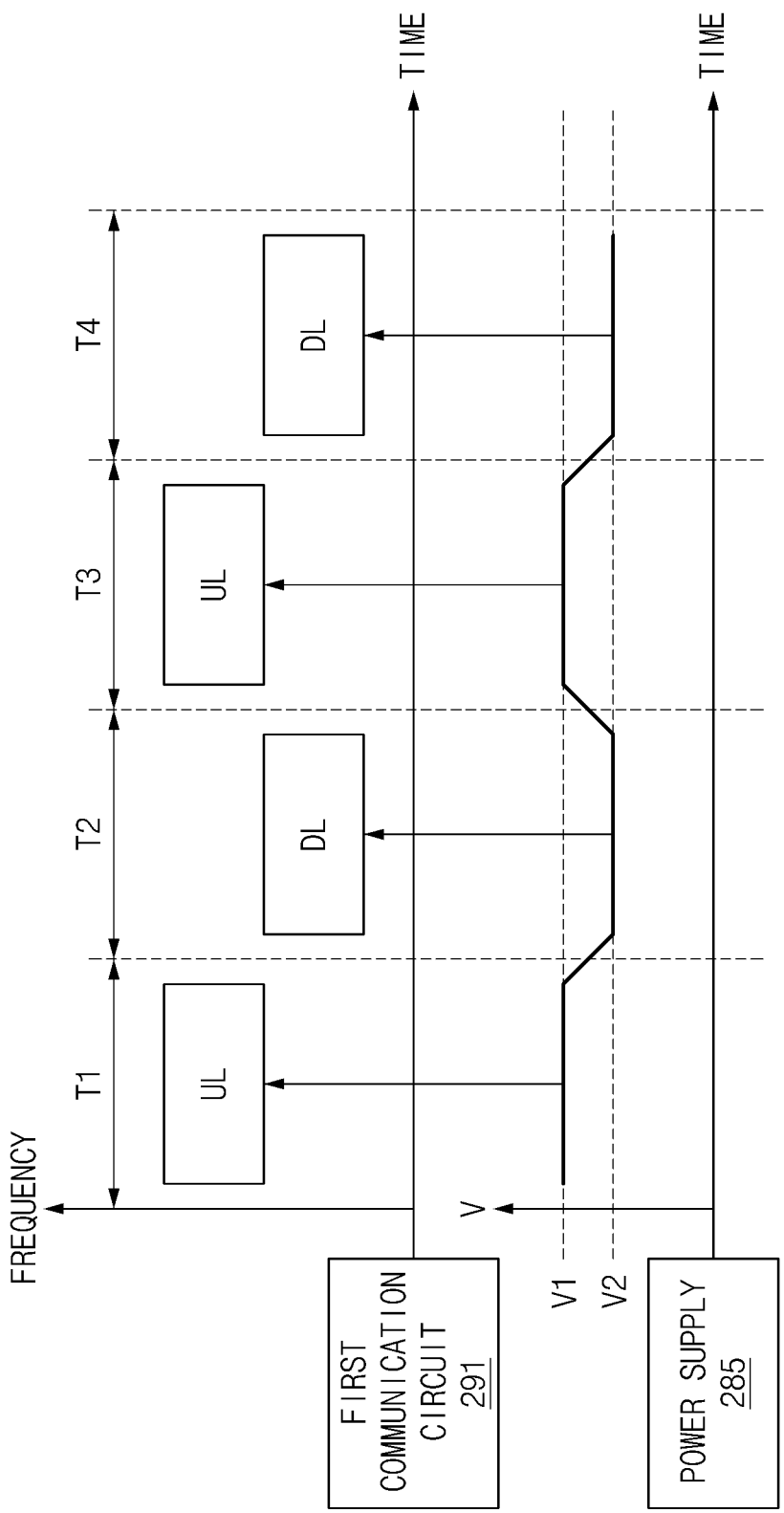
FIG. 8 is a diagram illustrating an example voltage supply according to various embodiments.

FIG. 8 is a diagram illustrating an example voltage supply according to various embodiments.

The electronic device 201 may be configured to transmit and receive a first signal and a second signal based on time-division duplexing (TDD). For example, the electronic device 201 may be configured to transmit and receive the first signal and the second signal for multiple transmission such as uplink carrier aggregation (CA) or EN-DC. According to an embodiment, the electronic device 201 may allocate a slot configuration so that an uplink section of a slot configuration associated with the first frequency band and an uplink section of a slot configuration associated with the second frequency band do not overlap each other. According to an embodiment, the electronic device 201 may divide one slot or subframe, thereby making it possible to perform uplink transmission so that the uplink section associated with the first signal and the uplink section associated with the second signal do not overlap each other.

In the example of FIG. 8, in the first time interval T1, the processor 220 may use the first communication circuit 291 to transmit an uplink (UL) signal for the first frequency band. In the first time interval T1, the power supply 285 may supply the first voltage V1 for controlling the transmit power of the uplink signal to the first communication circuit 291.

In the second time interval T2, the processor 220 may use the first communication circuit 291 to transmit an uplink (UL) signal for the second frequency band. In the second time interval T2, the power supply 285 may supply the second voltage V2 for controlling the transmit power of the uplink signal to the first communication circuit 291.

In a third time interval T3, the processor 220 may use the power supply 285 to supply the first voltage V1 to the first communication circuit 291, in order to transmit the signal of the first frequency band. In the fourth time interval T4, the processor 220 may use the power supply 285 to supply the second voltage V2 to the first communication circuit 291, in order to transmit the signal of the second frequency band.

In the example of FIG. 8, the first voltage V1 and/or the second voltage V2 may be set according to EPT, APT, or a specified value. In the present example, the first voltage V1 and the second voltage V2 are illustrated as having different values; however, embodiments of the present document are not limited thereto. In an example, the first voltage V1 and the second voltage V2 may be set to the same value.

In the example of FIG. 8, the processor 220 may set the time slot so that the uplink sections of the first frequency band and the second frequency band do not overlap each other, thereby making it possible to supply voltages for a plurality of frequency bands using one power supply. For example, each of the first to fourth time intervals T1, T2, T3, and T4 may correspond to one subframe or one slot.

In the example of FIG. 8, the processor 220 may divide the time slot or subframe so that a transmission section of the signal of the first frequency band and a transmission section of the signal of the second frequency band do not overlap each other. For example, the first time interval T1 and the second time interval T2 may include one subframe or one slot. The third time interval T3 and the fourth time interval T4 may include one subframe or one slot.

In the example of FIG. 8, the processor 220 may divide the time slot or subframe so that the uplink sections of the first communication circuit 291 and the second communication circuit 292 do not overlap each other. For example, the first time interval T1 and the second time interval T2 may include one subframe or one slot. The third time interval T3 and the fourth time interval T4 may include one subframe or one slot.

In FIG. 8, signals of two bands are illustrated; however, embodiments of the present disclosure are not limited thereto. The processor 220 may transmit signals using three or more bands. By providing transmission timings of uplink signals associated with a plurality of bands without overlapping as long as an uplink duty cycle allows, the processor 220 may use one power supply 285 to perform multiplex signal transmission using the plurality of bands.

Figure 9:
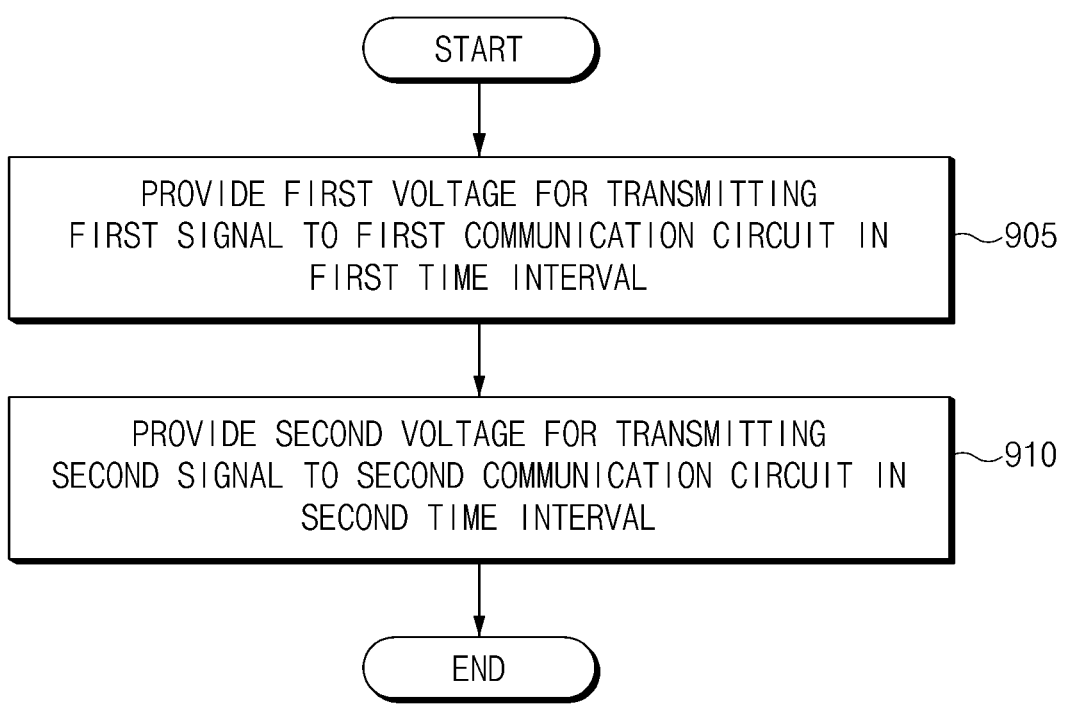
FIG. 9 is a flowchart illustrating an example voltage supply method according to various embodiments.

FIG. 9 is a flowchart illustrating an example voltage supply method according to various embodiments.

Hereinafter, various embodiments will be described with reference to the electronic device 201 of FIG. 2, 3, or 7 and various components illustrated in FIG. 4.

For example, an electronic device (e.g., the electronic device 201 of FIG. 2) may be configured to transmit and receive a first signal and a second signal based on time-division duplexing (TDD). The electronic device 201 may be configured to transmit and receive the first signal and the second signal for multiple transmission such as uplink carrier aggregation (CA) or EN-DC. As will be described later with reference to FIG. 9, the electronic device 201 may perform multiple uplink transmission so that the uplink section associated with the first communication circuit 291 and the uplink section associated with the second communication circuit 292 do not overlap each other, thereby making it possible to perform uplink transmission for a plurality of bands using one power supply.

In operation 905, the processor 220 of the electronic device 201 may provide, to the first communication circuit 291, the first voltage for transmitting the first signal in the first time interval. The processor 220 may control a gain of the first amplifier of the first communication circuit 291 based on the first voltage. The processor 220 may supply the first voltage to the first communication circuit 291 by identifying envelope information of the transmit power associated with the first communication circuit 291 and transmitting the identified envelope information to the power supply 285. The power supply 285 may transmit the first voltage to the first communication circuit 291 based on the received envelope information. The power supply 286 may control the gain of the first amplifier 411 by supplying the first voltage. The processor 220 may transmit the first signal based on the first radio resource configuration associated with the first cell.

For example, the first signal may be associated with the first frequency band. The processor 220 may receive a signal associated with the second frequency band using the second communication circuit 292 while the first signal is being transmitted.

In operation 910, the processor 220 of the electronic device 201 may provide, to the second communication circuit 292, the second voltage for transmitting the second signal in the second time interval. The processor 220 may control a gain of the second amplifier of the second communication circuit 292 based on the second voltage. The processor 220 may supply the second voltage to the second communication circuit 292 by identifying envelope information of the transmit power associated with the second communication circuit 292 and transmitting the identified envelope information to the power supply 285. The power supply 285 may transmit the second voltage to the second communication circuit 292 based on the received envelope information. The power supply 286 may control the gain of the second amplifier 412 by supplying the second voltage. The processor 220 may transmit the second signal based on the second radio resource configuration associated with the second cell.

For example, the second signal may be associated with the second frequency band. The processor 220 may receive a signal associated with the first frequency band using the first communication circuit 291 while the second signal is being transmitted.

For example, the first radio resource configuration and the second radio resource configuration may be based on time division duplexing, and an uplink time interval of the first radio resource configuration and an uplink time interval of the second radio resource configuration may not overlap each other. The processor 220 may receive the first radio resource configuration and the second radio resource configuration from the base station associated with the first cell.

In an example, the power supply 285 may identify the first voltage and the second voltage based on the average value of transmit power. For example, the power supply 285 may identify the first voltage based on the average value of the transmit power associated with the first communication circuit 291, and identify the second voltage based on the average value of the transmit power associated with the second communication circuit 292. The power supply 285 may be configured to output only one voltage within one time interval.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. An electronic device comprising:
first communication circuitry connected to a first antenna and including a first amplifier;
second communication circuitry connected to a second antenna and including a second amplifier;
a transceiver connected to the first communication circuitry and the second communication circuitry;
a processor electrically connected to the transceiver; and
a power supply configured to provide a voltage to one of the first amplifier or the second amplifier in a time domain and electrically connected to the first communication circuitry, the second communication circuitry, and the processor,
wherein the processor is configured to:
determine a first radio resource configuration of a first frequency band and a second radio resource configuration of a second frequency band for a plurality of time intervals corresponding to equal subframes such that uplink timing of the first frequency band and the second frequency band do not overlap each other in a time domain, the plurality of time intervals including a first time interval, a second time interval following the first time interval, and a third time interval overlapping a portion of the first time interval and a portion of the second time interval;

provide, to the first communication circuitry, a first voltage for transmitting a first signal of the first frequency band using the power supply in the first time interval of the plurality of time intervals, the first time interval being an uplink interval of the first radio resource configuration;

control the electronic device to change a configuration of the first communication circuitry to a downlink configuration in a guard period corresponding to a first portion of the second time interval;

control the electronic device to receive a signal of the second frequency band using the second communication circuitry in a first portion of the third time interval;

control the electronic device to change a configuration of the second communication circuitry to an uplink configuration in a guard period of the third time interval corresponding to the guard period of the second time interval;

provide, to the second communication circuitry, a second voltage for transmitting a second signal of the second frequency band using the power supply in a second portion of the third time interval, the second portion of the third time interval being an uplink interval of the second radio resource configuration; and control the electronic device to receive a signal of the first frequency band using the first communication circuitry in a second portion of the second time interval following the guard period of the second time interval, wherein the first radio resource configuration and the second radio resource configuration are based on time division duplexing.

2. The electronic device of claim 1, wherein the processor is configured to control a gain of the first amplifier based on the first voltage, and to control a gain of the second amplifier based on the second voltage.

3. The electronic device of claim 2, wherein the first amplifier is positioned on a transmission path of the first communication circuitry, and the second amplifier is positioned on a transmission path of the second communication circuitry.

4. The electronic device of claim 3, wherein the processor is configured to:

connect the first antenna to the transmission path of the first communication circuitry and the second antenna to a reception path of the second communication circuitry, in the first time interval; and connect the first antenna to a reception path of the first communication circuitry and the second antenna to the transmission path of the second communication circuitry, in the second time interval.

5. The electronic device of claim 1, wherein the processor is configured to:

identify first envelope information of transmit power associated with the first communication circuitry; and identify second envelope information of transmit power associated with the second communication circuitry.

6. The electronic device of claim 5, wherein the processor is configured to:

control the power supply to supply the first voltage to the first communication circuitry based on the first envelope information; and control the power supply to supply the second voltage to the second communication circuitry based on the second envelope information.

7. The electronic device of claim 1, wherein the first communication circuitry is associated with a first cell, the second communication circuitry is associated with a second cell, and the processor is configured to:

control the electronic device to transmit the first signal based on the first radio resource configuration associated with the first cell; and control the electronic device to transmit the second signal based on the second radio resource configuration associated with the second cell.

8. The electronic device of claim 7, wherein each of the first time interval corresponds to one uplink slot of the first radio resource configuration.

9. An electronic device comprising:

a first communication circuit connected to a first antenna and including a first amplifier;

a second communication circuit connected to a second antenna and including a second amplifier;

a processor connected to the first communication circuit and the second communication circuit; and a power supply configured to provide one voltage in a time domain and electrically connected to the first communication circuit, the second communication circuit, and the processor, wherein the processor is configured to:

determine a first radio resource configuration of a first frequency band and a second radio resource configuration of a second frequency band for a plurality of time intervals corresponding to equal subframes such that uplink timing of the first frequency band and the second frequency band do not overlap each other in a time domain, the plurality of time intervals including a first time interval, a second time interval following the first time interval, and a third time interval overlapping a portion of the first time interval and a portion of the second time interval;

control the electronic device to transmit, using the first communication circuit, a first signal of the first frequency band in the first time interval;

control the electronic device to receive, using the second communication circuit, a signal of the second frequency band in the first time interval;

control the electronic device to change a configuration of the first communication circuit to a downlink configuration in a guard period corresponding to a first portion of the second time interval and change a configuration of the second communication circuit to an uplink configuration in a first portion of the third time interval corresponding to the guard period;

control the electronic device to transmit, using the second communication circuit, a second signal of the second frequency band in a second portion of the third time interval; and control the electronic device to receive, using the first communication circuit, a signal of the first frequency band in a second portion of the second time interval;

wherein the power supply is configured to:

supply, to the first communication circuit, a first voltage for transmitting the first signal in the first time interval indicated by the first radio resource configuration; and supply, to the second communication circuit, a second voltage for transmitting the second signal in the second portion of the third time interval indicated by the second radio resource configuration, that does not overlap the first time interval, and wherein the first radio resource configuration and the second radio resource configuration are based on time division duplexing.

10. The electronic device of claim 9, wherein the first signal is a signal of a first frequency band, and
the second signal is a signal of a second frequency band different from the first frequency band.

11. The electronic device of claim 10, wherein the power supply is configured to:
control a gain of the first amplifier using the first voltage; and
control a gain of the second amplifier using the second voltage.

12. The electronic device of claim 10, wherein the power supply is configured to:
receive first envelope information of transmit power associated with the first communication circuit from the processor; and
receive second envelope information of transmit power associated with the second communication circuit from the processor.

13. The electronic device of claim 12, wherein the power supply is configured to:
supply a first voltage based on the first envelope information to the first communication circuit; and
supply a second voltage based on the second envelope information to the second communication circuit.

14. The electronic device of claim 9, wherein the processor is configured to:
receive the signal of the second frequency band using the second communication circuit in the first time interval; and
receive a signal of the first frequency band using the first communication circuit in the second portion of the third time interval.

15. The electronic device of claim 9, wherein the power supply is configured to:
identify the first voltage based on an average value of transmit power associated with the first communication circuit; and
identify the second voltage based on an average value of transmit power associated with the second communication circuit.

16. The electronic device of claim 9, wherein the first communication circuit is associated with a first cell,
the second communication circuit is associated with a second cell, and
the processor is configured to:
control the electronic device to transmit the first signal based on the first radio resource configuration associated with the first cell; and
control the electronic device to transmit the second signal based on the second radio resource configuration associated with the second cell.

* * * * *